US005650996A

United States Patent [19]

Bode et al.

[11] Patent Number: 5,650,996

[45] Date of Patent: Jul. 22, 1997

[54] METHOD AND CIRCUIT ARRANGEMENT FOR COMBINING SEVERAL DIGITAL DATA CHANNELS ON A TRANSMISSION CHANNEL

[76] Inventors: Friedrich-Wilhelm Bode, Hauptstr. 10, 31552 Apelern; Hans-Ulrich Rossius, Am Steinfeld 18, 31177 Harsum; Hans-Juergen Fischer, Sensburger Ring 56A; Andreas Vahle, Binderstr. 11, both of 31141 Hildesheim, all of Germany

[21] Appl. No.: 456,410

[22] Filed: Jun. 1, 1995

Related U.S. Application Data

[63] Continuation of Ser. No. 142,732, Oct. 25, 1993, abandoned.

[30] Foreign Application Priority Data

Oct. 24, 1992 [DE] Germany .......................... 42 36 002.1

[51] Int. Cl.[6] .......................... H04L 27/04; H04L 27/12; H04L 27/20

[52] U.S. Cl. .......................... 370/480; 370/538; 375/260; 375/295

[58] Field of Search .................................. 370/37, 110.4, 370/119, 24, 36, 53, 56, 84, 94.2, 102, 70, 38, 50; 375/222, 225, 260, 324, 282, 340, 341, 240, 219, 220, 257, 264, 267, 286, 287, 288, 295, 299; 341/70, 143; 455/102, 103, 118

[56] References Cited

U.S. PATENT DOCUMENTS

| | | | |
|---|---|---|---|
| 4,665,399 | 5/1987 | Fauser et al. | 340/870.32 |
| 4,899,350 | 2/1990 | Kage | 370/110.4 |
| 4,903,125 | 2/1990 | Parker | 370/37 |
| 4,972,408 | 11/1990 | Hervé et al. | 370/37 |
| 5,012,489 | 4/1991 | Burton et al. | 375/222 |

FOREIGN PATENT DOCUMENTS

| | | |
|---|---|---|
| 0191019 | 8/1986 | European Pat. Off. . |
| 38 39 421 A1 | 5/1990 | Germany . |
| 2 146 875 | 4/1985 | United Kingdom . |
| 2 220 824 | 1/1990 | United Kingdom . |

OTHER PUBLICATIONS

Dieter Conrads, *Moderne Kommunikationstechnik–Datenkommunikation,* Mit 116 Abbildungen und 9 Tabellen, 1989, pp. 34–37.

William C.Y. Lee, *Mobile Communications Engineering,* McGraw–Hill Book Company, 1982, pp. 342–343.

Bode et al., *Bit Error Measurements on a 5.8 GHz Mobile Radio Channel for Short Range Traffic Management Systems.*

*European Radiocommunications Committee* ( *ERC*), Report from the European Radiocommunications Committee within CEPT on the harmonization of frequency bands to be designated for Road transport Information Systems, ERC Report 3, Lisbon, Feb. 1991.

*Primary Examiner*—Alpus H. Hsu
*Assistant Examiner*—Ricky Q. Ngo

[57] ABSTRACT

A method and a circuit arrangement for combining several data channels with a transmission channel in which the carrier signal has at least two digital data signals, each with a different frequency, superimposed on it in terms of time. The superimposed signal is transmitted and received by a receiving device. The receiving device decodes the digital data signals and can pass them on, separately, to corresponding devices for further processing. The method and circuit arrangement may be advantageously used for data transmission between a motor vehicle and a fixed beacon. The data to be transmitted may contain traffic guidance data, or data for billing road use fees, for example.

18 Claims, 3 Drawing Sheets

METHOD AND CIRCUIT ARRANGEMENT FOR COMBINING SEVERAL DIGITAL DATA CHANNELS ON A TRANSMISSION CHANNEL

This is a continuation of application Ser. No. 08/142,732 filed on Oct. 25, 1993, now abandoned.

BACKGROUND OF THE INVENTION

The present invention relates to a method and a circuit arrangement for combining several digital data channels having different data rates, on a common transmission channel of a transmitter.

Transmitting data signals on a data channel with a certain frequency is known. In order to transmit a further data signal of a data channel, an additional transmission channel having a different frequency from the first transmission channel is needed. Unfortunately, if too many data signals are transmitted at the same time, there may be too few free data channels and transmission channels available to accommodate all of the data signals. Typically, in such a case, an electronic search circuit is employed to seek an available one of a plurality of transmission channels through which the desired data signal can still be transmitted. Such electronic search circuits are relatively complex. In addition, whether or not a free transmission channel can be found is a matter of chance.

Thus, there is a need for a method and device which permit a plurality of digital data channels to be transmitted over a single transmission channel, thereby eliminating the need for a search circuit.

SUMMARY OF THE INVENTION

The present invention provides a method, and a circuit arrangement implementing the method, which fulfill the above need. With the present invention, several data signals can be combined into a single transmission channel, thereby permitting the data signals to be transmitted essentially at the same time. As a result, fewer transmission channels are needed, which in turn increases transmission capacity. Further, with the present invention, the data signals to be transmitted can be advantageously evaluated independent of one another, to a significant extent at the receiver.

In a preferred embodiment of the method of the present invention, the modulation of the data channels is not restricted, thereby permitting the carrier frequency of the data signal to be amplitude-modulated or frequency-modulated.

In a preferred embodiment of the method of the present invention, the time of the data signals can be synchronized with a simple cycle signal, thereby permitting a clear assignment of the signals when the signals are decoded at the receiver.

In a preferred embodiment of the method of the present invention, the period of the additional data signal to be transmitted is a multiple of the period duration of the first data signal, thereby permitting easy signal separation and causing little signal loss.

In a preferred embodiment of the method of the present invention, the further data signal is modulated in the half bit period pursuant to the biphase/Manchester method. Since the signal becomes zero in the arithmetic mean in this process, signal errors can be easily recognized.

DETAILED DESCRIPTION

Figure 1:
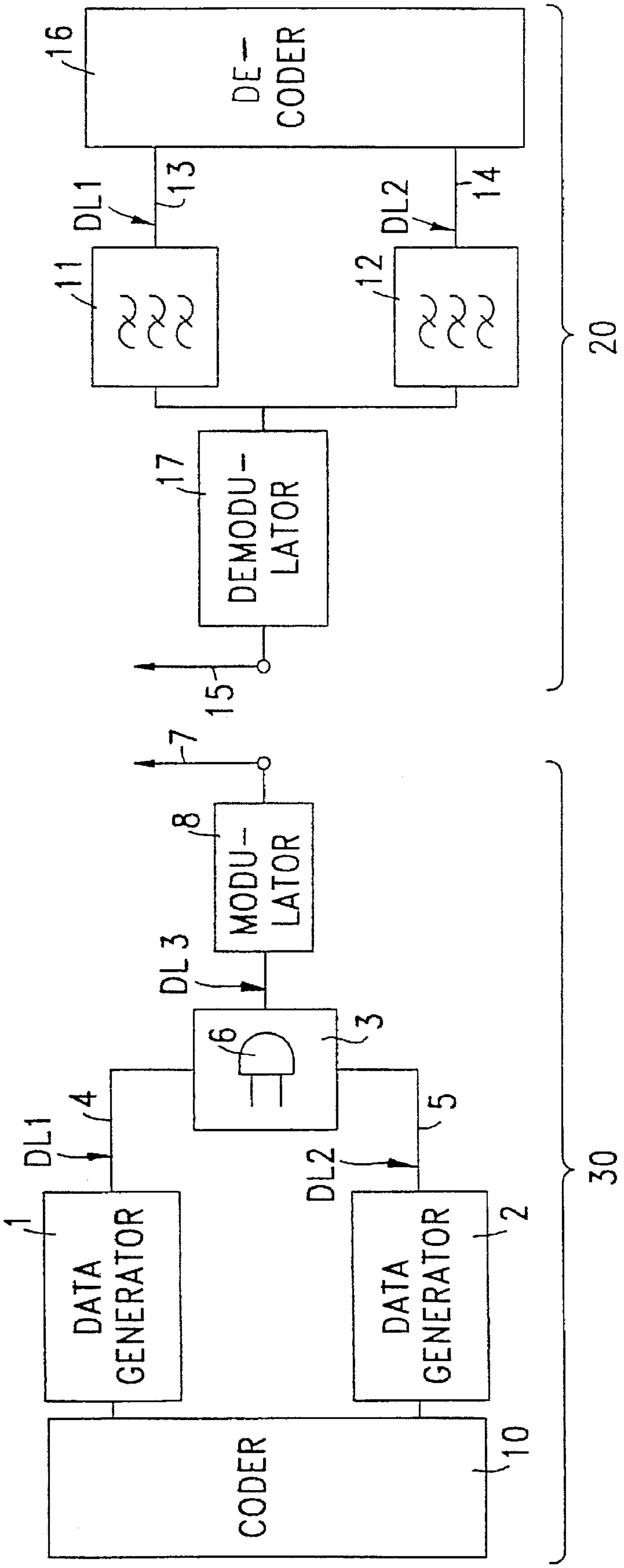
FIG. 1 is a block diagram illustrating a transmitter and receiver of the device of the present invention.

FIG. 1 is a schematic diagram which shows a transmitter and receiver of a device for implementing the method of the present invention. The transmitter 30 (and receiver 20) may include a known device 10 for transmitting binary coded data signals such as, for example, from European Patent Application No. EP 0 191 019 B1. According to the present invention, the transmitting side of such a known device 10 is coupled with one or more data generators 1, 2, each data generator having an assigned data channel. The outputs of the data generators 1, 2 are coupled, via data lines 4, 5, with the inputs of a linking stage 3. The linking stage 3 links (i.e., combines) the data signals of the data generators 1, 2 into a single output signal DL3, and may comprise commercially available gate circuits 6 (e.g. AND elements) which join inputted signals together into a new signal.

The output signal DL3 is modulated in a modulator 8 and broadcast via an antenna 7, together with the carrier frequency of the transmitter. The data signals may be transmitted pursuant to the semipassive transponder method. A cycle signal T is provided to synchronize the data generators 1, 2. The cycle signal T may be formed by the data generator 2, for example, and applied to a control input of the data generator 1.

Figure 2:
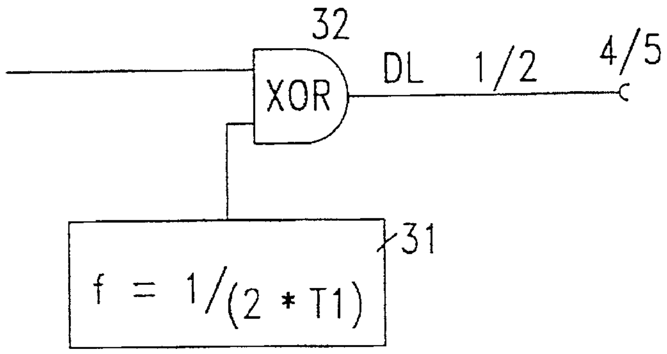
FIG. 2 is a schematic diagram showing the structure of a data generator of the transmitter of the present invention.

FIG. 2 is a schematic which shows the basic structure of the data generators 1, 2. The data generators 1, 2 each include a cycle generator 31, which oscillates at a frequency of $f=1/(2\times T1)$. T1 is half the period duration of the signal. The cycle generator 31 is coupled with an input of a logic circuit 32 (exclusive OR). The data signal to be transmitted is applied to a second input of the logic circuit 32. The logic circuit 32 includes an output which provides the data signal DL1 or DL2, respectively. This signal is provided to an input of the linking stage 3. The linked signal DL3 is provided to the antenna 7 via the modulator 8.

The receiver 20 is provided with a reception antenna 15 coupled with a demodulator 17. One or more filters 11, 12 are provided between a decoder 16 and the demodulator 17. These filters 11, 12 separate the incoming data signal DL3 in accordance with the transmitted data signals. The filters 11, 12 are structured as a known band pass filter or frequency diplexer. The demodulator 17 is also commercially available.

The separated data signals are passed to inputs of a commercially available decoder 16 on separate lines 13, 14. Depending on which transmission channel the receiver 20 is set, decoding takes place only for the data signal which was intended for this receiver.

Figure 4:
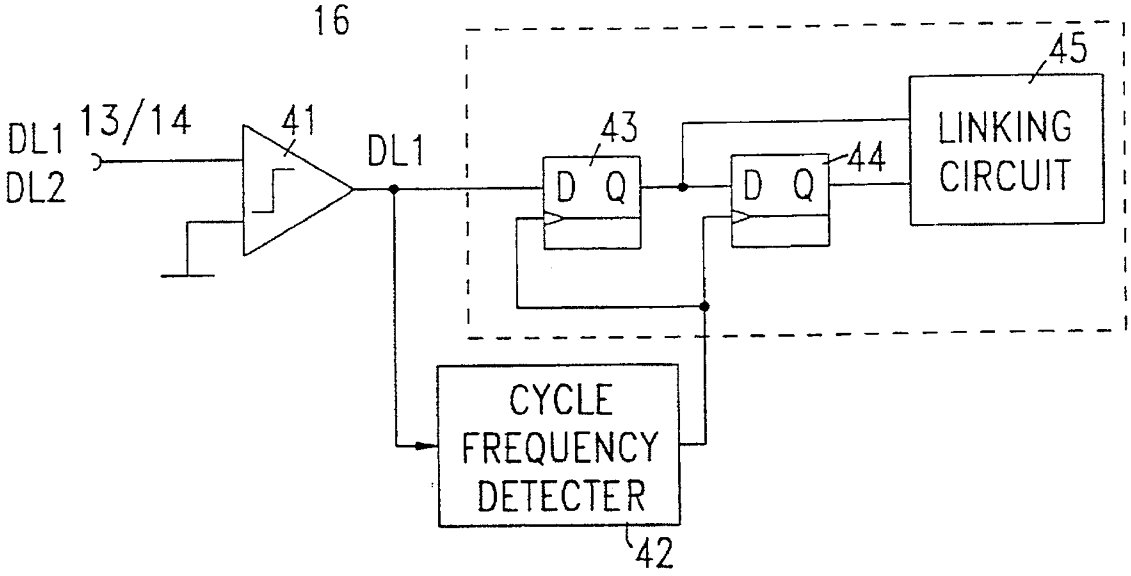
FIG. 4 is a block diagram illustrating a decoder 16 for decoding the biphase/Manchester code.

FIG. 4 is a block diagram showing the decoder 16 for decoding the biphase/Manchester code. The incoming data signal DL1 or DL2 on the line 13 or 14, respectively, is passed via a comparator 41 for signal formation reasons.

Figure 3:
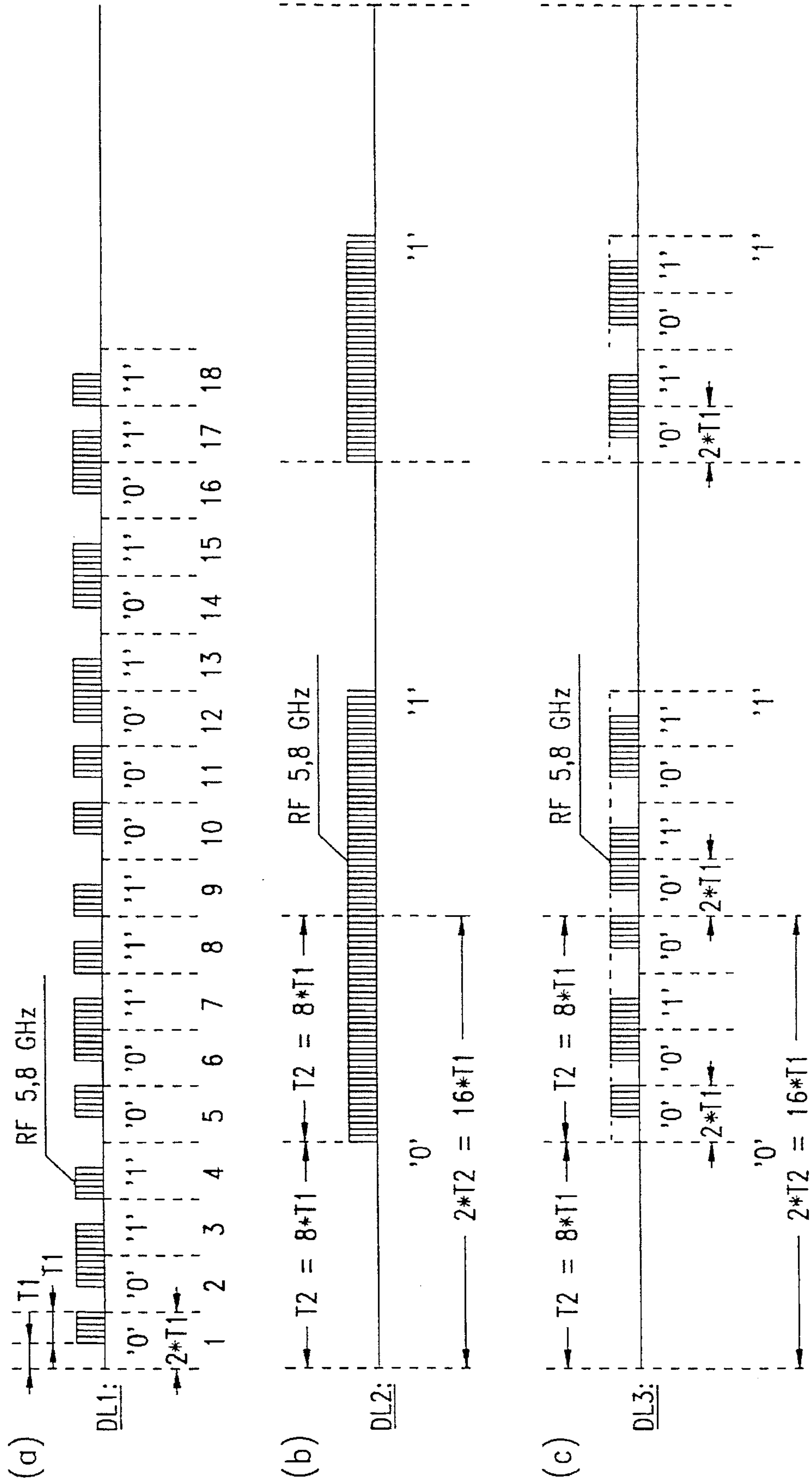
FIG. 3(*a* through *c*) are impulse diagrams illustrating the method of the present invention.

The cycle frequency for the BIT period depicted in FIG. 3 is derived from the data signal DL1 or DL2 by element 42. Actual decoding takes place by means of two subsequent D flip-flops 43 and 44. The output signals of the D flip-flops 43 and 44 are provided to inputs of a linking circuit 45. In the linking circuit, the output signals of the D flip-flops 43 and 44 are combined as a function of the related cycle signal. The decoded data signal DL1 or DL2 is provided at an output of the linking circuit 45.

The receiver 20, for example, may be structured to receive and evaluate only traffic guidance data. In such a case, the receiver 20 decodes only the signals of the data signal DL1 with its decoder 16. Another receiver, on the other hand, can also decode the data signal DL2, or decode only a signal used for billing road use fees, for example.

A typical application of data signal transmission is bi-directional data transmission between a motor vehicle and a fixed beacon at the side of the road. Using this transmission path, road traffic data, road maps or recommended driving directions can be transmitted from the beacon to the motor vehicle. Further, transmitting navigation data, for example concerning the location of the vehicle within the scope of fleet management, is also possible.

In the device for implementing the method of the present invention, only one transmission channel is used to transmit the transmission signal DL3. However, this channel is modulated with the two data signals of the data generators 1, 2. It is practical to modulate the channel according to the amplitude modulation method (amplitude shift keying, ASK) and/or the frequency modulation method (frequency shift keying, FSK). These modulation methods are particularly advantageous, since relatively error-free transmission is guaranteed and since coding and decoding can be carried out digitally, with relatively simple means. In transmission operations from a beacon to a vehicle (down link operation), ASK modulation is particularly advantageous, while in transmission operations from the vehicle to the beacon (up link operation), FSK modulation is particularly advantageous.

In addition to the known coding methods, the biphase/Manchester method is preferably provided. Here, the signals from two signal elements are brought together, phase-shifted by 180° (See, e.g., Conrads, *Moderne Kommunikationstechnik*, pages 36–37; or W. Lee, *Mobile Communications Engineering*, pages 342–343).

FIGS. 3*a*–3*c* are timing diagrams which illustrate the method of the present invention as effected by the circuit arrangement. FIG. 3*a* illustrates the data signal DL1 of the data line 4. The data signal DL1, for example, operates at a carrier frequency RF of 5.8 GHz. The time axis is divided into 18 BIT periods 1 . . . 18, where the duration of one bit period is 2×T1. In the first bit period, the carrier signal RF appears in the second half period, while no signal appears in the first half period. This first bit period corresponds to logic '0'. Correspondingly, in the third bit period the carrier signal RF appears in the first half period but does not appear in the second half period. This represents the value logic '1'. In this way, the logic signals '0' and '1' are coded in accordance with the desired data by the data generator 1.

FIG. 3*b* illustrates the data signal DL2. Here, the bit period duration is a multiple of the data signal DL1, according to the formula 2×T2=n×T1.

In the example illustrated, the period duration T2 of the data signal DL2 is 8 times as long as the present duration T1 of the data signal DL1. Coding with logic '0' and '1' values takes place in the same manner as for data signal DL1.

If these two data signals DL1 and DL2 are added (i.e., combined) in the linking stage 3, for example with an AND gate, then the signal DL3 to be transmitted is provided at the output of the linking stage. FIG. 3*c* illustrates the signal DL3. The signal DL3 is transmitted after modulation with a commercially available modulator 8, via the antenna 7, and received by the antenna 15. In the receiver 20, the data signal DL1 and the data signal DL2 are decoded from this signal.

In a particular embodiment of the present invention, the data signal DL1 contains traffic guidance data, while the low-frequency data signal DL2 can be used for billing road use fees, parking lot fees, etc. On the receiver side, corresponding reception devices can then be used, which process both signals jointly or can evaluate them individually.

In a particularly advantageous and simple embodiment of the present invention, connecting a simple device for billing the road use fee to the receiver is possible without changing the transmission side. This device then evaluates only the data signal DL2. The data signal DL1 can be evaluated with a different device, for example with a location and navigation device. This device can also be coupled with the receiver 20.

What is claimed is:

1. A method for combining at least two digital data channels, having different data rates, on a transmission channel of a transmitter, comprising the steps of:

a) generating a first stream of binary data having a first bit period and modulating the first stream of binary data with a first cycle frequency signal to form a modulated first stream of binary data;

b) generating a second stream of binary data having a second bit period longer than the first bit period, wherein the second bit period is a whole number multiple of the first bit period, and modulating the second stream of binary data with a second cycle frequency signal to form a modulated second stream of binary data;

c) combining the modulated first stream of binary data and the modulated second stream of binary data, to form an output signal; and d) modulating the output signal at a carrier frequency on the transmission channel.

2. The method of claim 1 wherein the first bit period is the reciprocal of a frequency of the first cycle frequency signal.

3. A method for mixing at least two digital data channels for transmission on a transmission channel, the method comprising the steps of:

a) modulating a first data signal having a first data rate, at a carrier frequency, to form a first modulated data signal;

b) modulating a second data signal having a second data rate higher than the first data rate, at the carrier frequency, to form a second modulated data signal;

c) mixing the first and second modulated data signals to form a mixed data signal; and d) transmitting the mixed data signal over the transmission channel to a receiver having means for separating the first and second data signals, wherein the first and second data signals have first and second bit periods, respectively, the second bit period being a whole number multiple of the first bit period.

4. The method of claim 3 wherein the first and second data signals of the data channels are amplitude-modulated.

5. The method of claim 4 wherein the amplitude modulation is amplitude shift keying.

6. The method of claim 3 wherein the first and second data signals of the data channels are frequency-modulated.

7. The method of claim 6 wherein the frequency modulation is frequency shift keying.

8. The method of claim 3 wherein one of the first and second data signals of the data channels is amplitude-modulated and another of the first and second data signals is frequency-modulated.

9. The method of claim 3 wherein the first and second data signals are time synchronized with a cycle signal.

10. The method of claim 3 wherein the second data signal is modulated during a half bit period in which the carrier frequency is transmitted, in each instance.

11. The method of claim 10 wherein the second data signal is modulated according to the biphase/Manchester method.

12. A circuit arrangement adapted to couple at least two digital data channels having different data rates with a transmission channel, having a carrier frequency, of a transmitter, the circuit arrangement comprising:

at least two data generators, each of the at least two data generators generating a data signal which is time synchronized with a cycle signal T and which has been combined with a respective cycle frequency signal, and each of the at least two data generators having a respective data signal output;

a mixer coupled with the outputs of the at least two data generators and adapted to form a total data signal by mixing the data signals output by the data generators; and a modulator adapted to modulate the total data signal with a carrier signal at the carrier frequency for transmission, wherein a first and second of the data signals have first and second bit periods, respectively, the second bit period being a whole number multiple of the first bit period.

13. The circuit arrangement of claim 12 further comprising b) a receiver, the receiver having a separator assigned to the data signals to be transmitted.

14. The circuit arrangement of claim 13 wherein the separator is a frequency diplexer.

15. The circuit arrangement of claim 13 wherein the separator is a filter.

16. The circuit arrangement of claim 13 wherein the transmitter is located in a motor vehicle and the receiver is located in a fixed beacon, thereby permitting data signals to be transmitted from the motor vehicle to the fixed beacon.

17. The circuit arrangement of claim 13 wherein the receiver is located in a motor vehicle and the transmitter is located in a fixed beacon, thereby permitting data signals to be transmitted from the fixed beacon to the motor vehicle.

18. The circuit arrangement of claim 12 wherein the data signals are transmitted pursuant to the semipassive transponder method.

* * * * *